(12) United States Patent
Toyota

(10) Patent No.: US 10,603,998 B2
(45) Date of Patent: Mar. 31, 2020

(54) BATTERY MOUNTING STRUCTURE

(71) Applicant: TOYOTA JIDOSHA KABUSHIKI KAISHA, Toyota-shi, Aichi-ken (JP)

(72) Inventor: Masaru Toyota, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/021,809

(22) Filed: Jun. 28, 2018

(65) Prior Publication Data
US 2019/0009662 A1  Jan. 10, 2019

(30) Foreign Application Priority Data

Jul. 5, 2017  (JP) .................................. 2017-132317

(51) Int. Cl.
*B60K 1/04* (2019.01)
*B60L 50/64* (2019.01)
*B60L 50/60* (2019.01)

(52) U.S. Cl.
CPC ............... *B60K 1/04* (2013.01); *B60L 50/64* (2019.02); *B60L 50/66* (2019.02); *B60K 2001/0438* (2013.01); *B60K 2001/0472* (2013.01); *B60L 2270/142* (2013.01); *B60Y 2306/01* (2013.01)

(58) Field of Classification Search
CPC .............. B60K 1/04; B60K 2001/0472; B60K 2001/0438; B60L 50/64; B60Y 2306/01
See application file for complete search history.

(56) References Cited

U.S. PATENT DOCUMENTS

| | | | | |
|---|---|---|---|---|
| 6,227,322 B1* | 5/2001 | Nishikawa | ............. | B60R 16/04 180/65.1 |
| 7,401,669 B2* | 7/2008 | Fujii | .............. | B60R 16/04 180/65.1 |
| 7,654,352 B2* | 2/2010 | Takasaki | ................. | B60K 1/04 180/68.5 |
| 8,210,301 B2* | 7/2012 | Hashimoto | ............. | B60K 1/04 180/68.5 |
| 8,877,364 B2* | 11/2014 | Hashimura | ............. | B60K 1/04 180/68.5 |
| 8,900,744 B2* | 12/2014 | Loo | .................... | H01M 2/1229 429/172 |
| 8,910,737 B2* | 12/2014 | Saeki | ....................... | B60K 1/04 180/68.5 |
| 9,038,757 B2* | 5/2015 | Ogushi | ................... | B60K 1/04 180/68.5 |
| 9,045,030 B2* | 6/2015 | Rawlinson | ............... | B60K 1/04 |
| 9,419,263 B2* | 8/2016 | Nakamori | .......... | H01M 2/1077 |
| 9,499,057 B2* | 11/2016 | Takishita | ................. | B60L 3/00 |
| 9,505,442 B2* | 11/2016 | Wu | ........................ | B62D 21/157 |
| 9,623,742 B2* | 4/2017 | Ikeda | ........................ | B60K 1/04 |
| 9,758,030 B2* | 9/2017 | Newman | ................. | B60L 50/66 |

(Continued)

FOREIGN PATENT DOCUMENTS

| | | |
|---|---|---|
| JP | 2014093209 A | 5/2014 |
| JP | 2014226957 A | 12/2014 |

*Primary Examiner* — Jacob B Meyer
(74) *Attorney, Agent, or Firm* — Oliff PLC

(57) ABSTRACT

A battery mounting structure, includes: a battery pack mounted below a floor pan of a vehicle cabin; a vehicle body framework member to which a vehicle horizontal direction end portion of the floor pan is joined; and a sealing member that has resilience and that plugs a gap between the battery pack and the vehicle body framework member.

8 Claims, 16 Drawing Sheets

(56) References Cited

U.S. PATENT DOCUMENTS

| | | | |
|---|---|---|---|
| 9,796,424 B2* | 10/2017 | Sakaguchi | B60K 1/04 |
| 10,023,038 B2* | 7/2018 | Rawlinson | B60K 1/04 |
| 10,112,470 B2* | 10/2018 | Hamilton | B60K 1/04 |
| 10,118,475 B2* | 11/2018 | Sugizaki | B60K 1/04 |
| 10,173,511 B2* | 1/2019 | Hara | B60K 1/04 |
| 10,336,211 B2* | 7/2019 | Kobayashi | B60K 1/04 |
| 2009/0152034 A1* | 6/2009 | Takasaki | B60K 1/04 180/68.5 |
| 2009/0197154 A1* | 8/2009 | Takasaki | B60K 1/04 429/83 |
| 2010/0273040 A1* | 10/2010 | Kubota | B60K 1/04 429/100 |
| 2010/0307848 A1* | 12/2010 | Hashimoto | B60K 1/04 180/68.5 |
| 2012/0115000 A1* | 5/2012 | Hashimura | B60K 1/04 429/100 |
| 2012/0164500 A1* | 6/2012 | Loo | H01M 2/1072 429/82 |
| 2013/0127200 A1* | 5/2013 | Saeki | B60K 1/04 296/37.14 |
| 2013/0270864 A1* | 10/2013 | Young | B60K 1/04 296/187.12 |
| 2014/0062182 A1* | 3/2014 | Takishita | B60L 3/00 307/9.1 |
| 2014/0326524 A1* | 11/2014 | Ogushi | B60K 1/04 180/68.5 |
| 2014/0367182 A1* | 12/2014 | Yoshinaga | B60K 1/04 180/68.4 |
| 2015/0255764 A1* | 9/2015 | Loo | H01M 2/1083 429/149 |
| 2015/0357606 A1* | 12/2015 | Nishimura | H01M 2/024 429/176 |
| 2017/0018745 A1* | 1/2017 | Nakamori | H01M 2/043 |
| 2017/0225557 A1* | 8/2017 | Newman | B60L 50/64 |
| 2017/0305250 A1* | 10/2017 | Hara | B60K 1/04 |
| 2018/0237078 A1* | 8/2018 | Toyota | C09J 5/06 |
| 2018/0361874 A1* | 12/2018 | Kobayashi | B60K 1/04 |
| 2018/0370344 A1* | 12/2018 | Hara | B60K 1/04 |
| 2019/0009662 A1* | 1/2019 | Toyota | B60K 1/04 |
| 2019/0047419 A1* | 2/2019 | Kellner | B60L 50/64 |
| 2019/0157642 A1* | 5/2019 | Toyota | H01M 2/1077 |

\* cited by examiner

BATTERY MOUNTING STRUCTURE

CROSS-REFERENCE TO RELATED APPLICATION

This application is based on and claims priority under 35 USC 119 from Japanese Patent Application No. 2017-132317 filed on Jul. 5, 2017, the disclosure of which is incorporated by reference herein.

BACKGROUND

Technical Field

The present disclosure relates to a battery mounting structure for mounting a battery below a floor pan of a vehicle.

Related Art

In a battery-equipped vehicle recited in Japanese Patent Application Laid-Open (JP-A) No. 2014-226957, a battery unit (a battery pack) is mounted below a floor panel (a floor pan), between left and right side members. This battery unit is supported by cross-members of which respective end portions are fixed to the left and right side members.

In the battery-equipped vehicle with the structure described above, because the battery unit is mounted below the floor panel, the battery unit may be utilized as a structure for moderating noise intruding into a vehicle cabin from below the floor. However, there are regions at both front and rear end sides and both left and right end sides of the floor panel that are not covered from the vehicle lower side by the battery unit. As a result, noise intrudes into the vehicle cabin through these regions.

SUMMARY

In consideration of the circumstances described above, an object of the present disclosure is to provide a battery mounting structure, for a structure in which a battery pack is mounted below a floor pan, that may moderate noise intruding into a vehicle cabin from below the floor with a simple structure.

A battery mounting structure according to a first aspect of the present disclosure includes: a battery pack mounted below a floor pan of a vehicle cabin; a vehicle body framework member to which a vehicle horizontal direction end portion of the floor pan is joined; and a sealing member that has resilience and that plugs a gap between the battery pack and the vehicle body framework member.

In the first aspect of the present disclosure, the battery pack is mounted below the floor pan of the vehicle cabin, and the vehicle body framework member is joined to the vehicle horizontal direction end portion of the floor pan. The gap between the vehicle body framework member and the battery pack is plugged by the sealing member that has resilience. Therefore, noise intruding into the vehicle cabin from below the floor may be moderated with a simple structure. Note that the present disclosure is not limited to a structure in which the sealing member plugs (closes off) the whole of the gap. That is, provided the above-mentioned noise intrusion moderating effect is provided by the sealing member, structures in which some of the gap is not plugged by the sealing member are encompassed by the present disclosure.

In a battery mounting structure according to a second aspect of the present disclosure, in the first aspect, a first fitting portion formed at the sealing member is fitted together with a second fitting portion formed at one of the battery pack or the vehicle body framework member, and the sealing member is retained at the one of the battery pack or the vehicle body framework member.

In the second aspect of the present disclosure, as described above, the sealing member is retained at the one structure of the battery pack and the vehicle body framework member. Therefore, if the sealing member has been retained at the one structure before the battery pack is mounted to the vehicle, an operation for assembly of the sealing member after the battery pack has been mounted to the vehicle is unnecessary.

In a battery mounting structure according to a third aspect of the present disclosure, in the second aspect, the one of the battery pack or the vehicle body framework member comprises an extrusion-molded component, and the second fitting portion comprises a groove or projection formed at the extrusion-molded component along an extrusion direction of the extrusion-molded component.

According to the third aspect of the present disclosure, the one structure of the battery pack and the vehicle body framework member includes the extrusion-molded component. The groove or projection (second fitting portion) with which the first fitting portion formed at the sealing member fits is formed at the extrusion-molded component. Because the groove or projection is formed along the extrusion direction of the extrusion-molded component, this groove or projection may be formed during extrusion molding of the extrusion-molded component.

In a battery mounting structure according to a fourth aspect of the present disclosure, in the first aspect: the vehicle body framework member includes a rocker extending in a vehicle front-and-rear direction; a floor plate of a battery case is joined to the rocker, the battery case being an outer casing of the battery pack; and the gap is partitioned from a vehicle exterior by the floor plate.

In the fourth aspect of the present disclosure, in addition to the gap between the battery case and the vehicle body framework member being plugged by the sealing member, the gap is partitioned from the vehicle exterior by the floor plate of the battery case. Therefore, noise intruding into the vehicle cabin from below the floor may be moderated further.

As described above, in a structure in which a battery pack is mounted below a floor pan, the battery mounting structure according to the present disclosure may moderate noise intruding into a vehicle cabin from below the floor with a simple structure.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
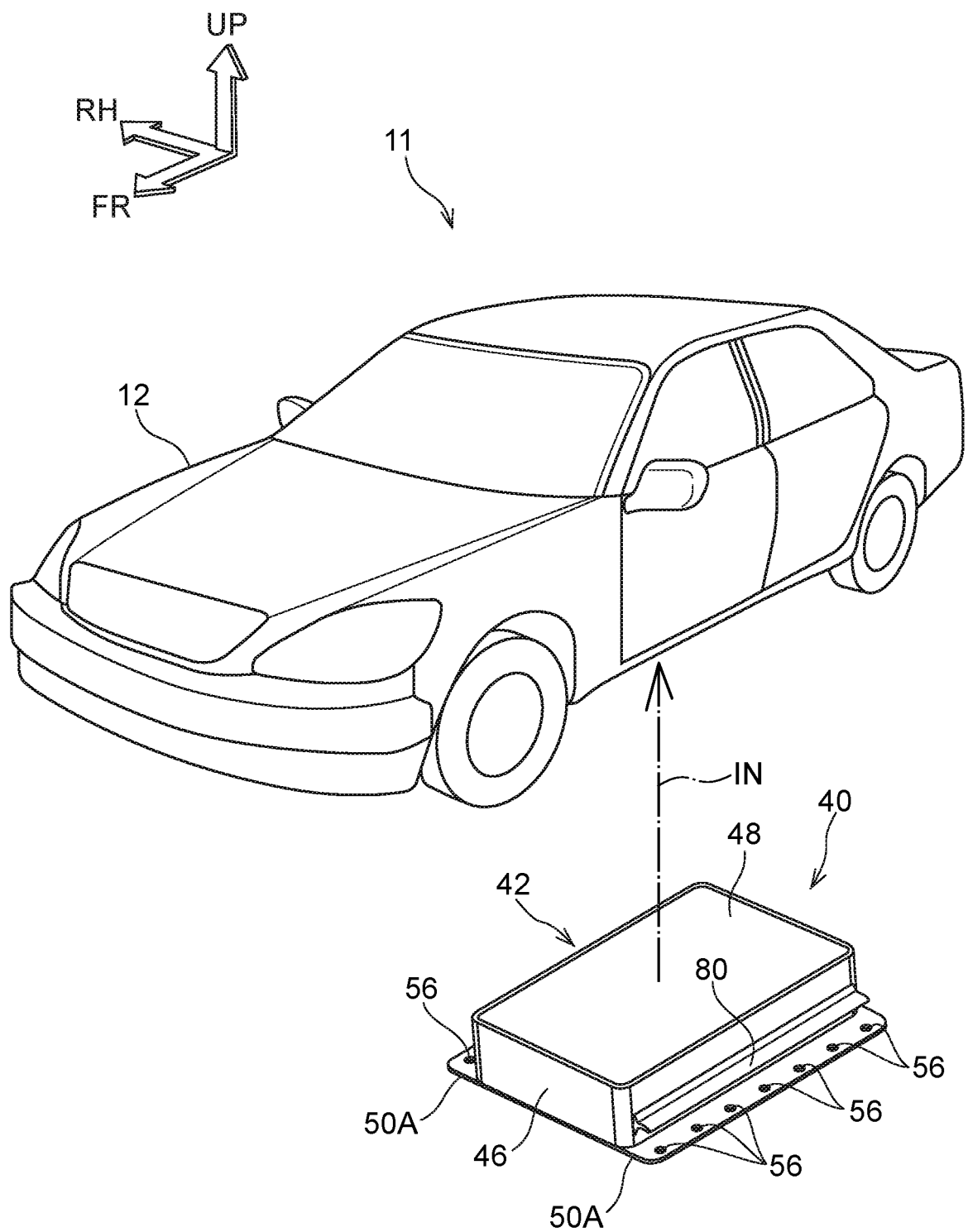
FIG. 1 is a perspective view showing a state in which a battery pack is removed from a vehicle in which a battery mounting structure according to a first exemplary embodiment of the present disclosure is employed.

A battery mounting structure 10 according to a first exemplary embodiment of the present disclosure is described below using FIG. 1 to FIG. 6. The arrow FR, arrow UP, arrow LH and arrow RH that are marked in the drawings as appropriate indicate, respectively, a front direction (progress direction), an upper direction, a left direction and a right direction of an electric car (vehicle) 11 in which the battery mounting structure 10 is employed. Hereinafter, where descriptions are given simply using the directions front and rear, left and right, and up and down, unless specifically stated otherwise, these indicate front and rear in the vehicle front-and-rear direction, left and right in the vehicle left-and-right direction (the vehicle width direction), and up and down in the vehicle vertical direction. Some of the reference symbols may be omitted in some of the drawings with a view to aiding viewing of the drawings.

First Exemplary Embodiment

Figure 2:
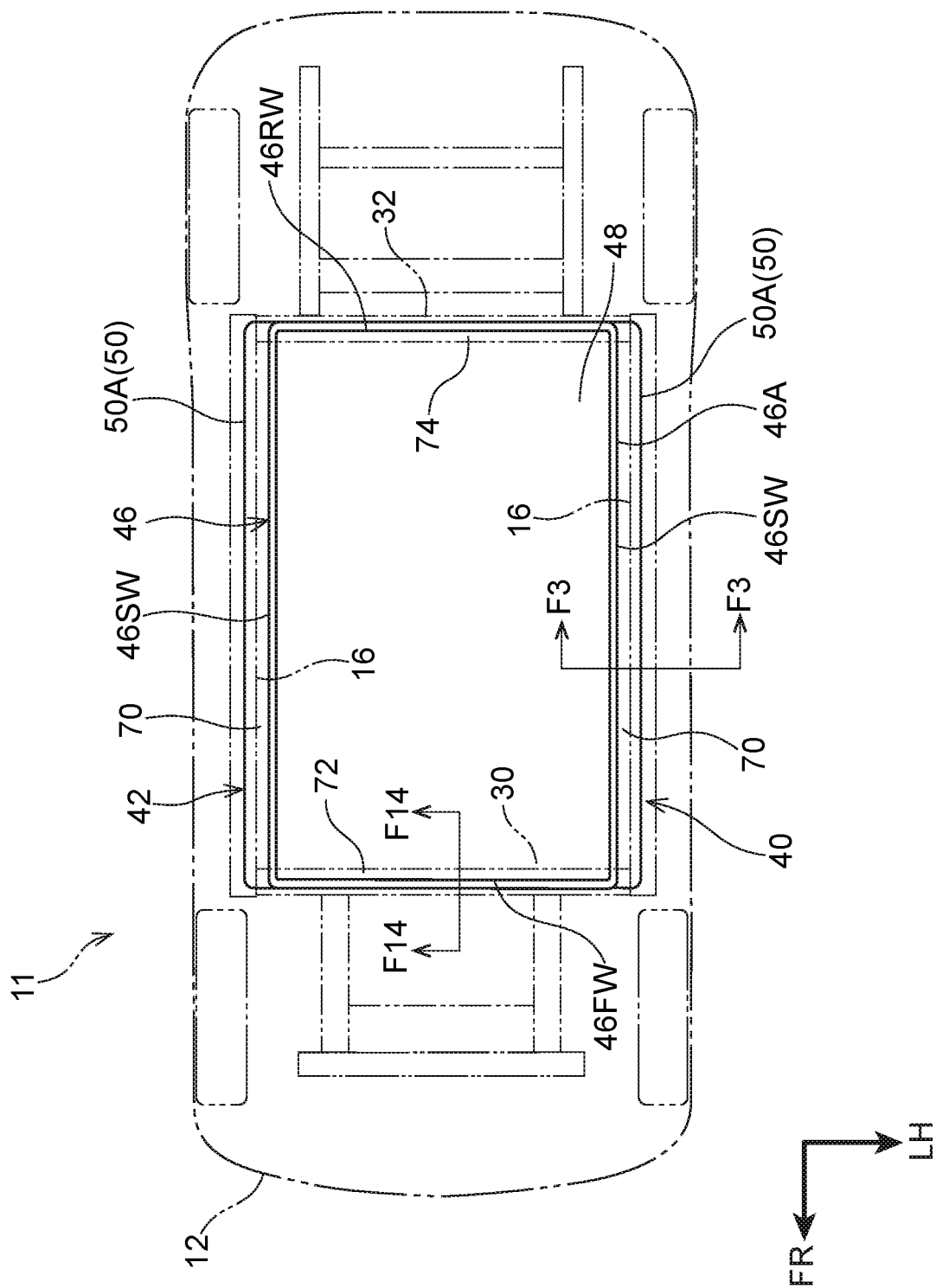
FIG. 2 is a plan diagram of the same vehicle.
Figure 3:
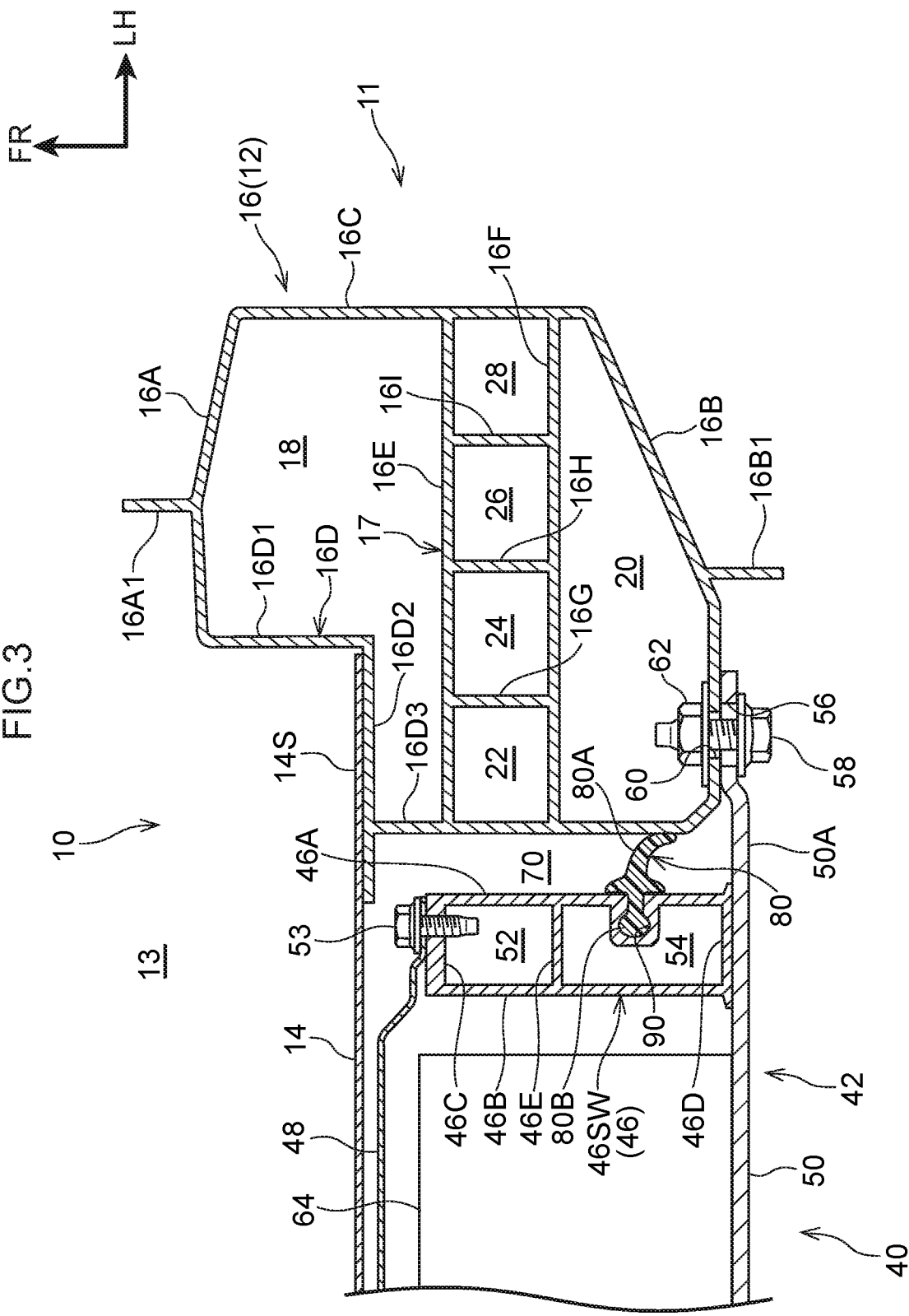
FIG. 3 is a sectional diagram showing a magnification in a plane cut along line F3-F3 in FIG. 2.

As shown in FIG. 1 and FIG. 2, an electric car 11 according to the present exemplary embodiment is provided with a sedan-type vehicle body 12. As shown in FIG. 3, a battery pack (battery unit) 40 is mounted below a floor pan 14 structuring a floor portion of a vehicle cabin 13. The battery pack 40 is formed substantially in a flattened cuboid shape and is mounted over substantially the whole area of the underfloor of the vehicle cabin 13.

As shown in FIG. 2, the battery pack 40 is disposed between a left and right pair of rockers 16. The left and right rockers 16 extend in the vehicle front-and-rear direction at two vehicle width direction end portions of the underfloor of the vehicle cabin 13. Front end portions of the left and right rockers 16 are linked by a front cross-member 30 extending in the vehicle width direction. Rear end portions of the left and right rockers 16 are linked by a rear cross-member 32 extending in the vehicle width direction. The front cross-member 30 and the rear cross-member 32 are connected to the left and right rockers 16 via connecting members that are not shown in the drawings. The front cross-member 30 and rear cross-member 32 are disposed at the vehicle upper side relative to the left and right rockers 16. The left and right rockers 16, the front cross-member 30 and the rear cross-member 32 are extrusion-molded components fabricated by extrusion molding of, for example, a lightweight metal such as an aluminium alloy or the like. The rockers 16, front cross-member 30 and rear cross-member 32 constitute portions of the framework of the vehicle body 12. The left and right rockers 16 correspond to a "vehicle body framework member" of the present disclosure. Firstly below, the structure of each rocker 16 is described, and then the structure of the battery pack 40 and structures of principal portions of the present exemplary embodiment are described in that order.

—Structure of the Rockers 16—

Each rocker 16 is formed in a long, narrow shape that is longest in the vehicle front-and-rear direction, and is formed as a substantially rectangular chamber extending in the vehicle front-and-rear direction. More specifically, as shown in FIG. 3, the rocker 16 is provided with an upper wall portion 16A and lower wall portion 16B that oppose one another in the vehicle vertical direction, an outer wall portion 16C that links vehicle width direction outer side end portions of the upper wall portion 16A and the lower wall portion 16B in the vehicle vertical direction, and an inner wall portion 16D that links vehicle width direction inner side end portions of the upper wall portion 16A and the lower wall portion 16B in the vehicle vertical direction. In the present exemplary embodiment, the upper wall portion 16A, the lower wall portion 16B and the inner wall portion 16D are inflected in a vehicle front-and-rear direction view, but this is not limiting. The shapes of the upper wall portion 16A, the lower wall portion 16B and the inner wall portion 16D in the vehicle front-and-rear direction view may be modified as appropriate.

A rib 16A1 for attaching components is provided protruding toward the vehicle upper side in a vicinity of a vehicle width direction central portion of the upper wall portion 16A. A rib 16B1 for attaching components is provided protruding toward the vehicle lower side in a vicinity of a vehicle width direction central portion of the lower wall portion 16B. These ribs 16A1 and 16B1 are used as joining portions with neighboring components (pillars and the like, which are not shown in the drawings). The rib 16A1 at the upper side is also used as a weatherstrip attachment portion.

The outer wall portion 16C extends in the vehicle vertical direction in the vehicle front-and-rear direction view, and the inner wall portion 16D is inflected in a crank shape (a stepped shape) in the vehicle front-and-rear direction view. The inner wall portion 16D is structured by an upper side vertical portion 16D1, a middle horizontal portion 16D2, and a lower side vertical portion 16D3. The upper side vertical portion 16D1 extends toward the vehicle lower side from a vehicle width direction inner side end portion of the upper wall portion 16A. The middle horizontal portion 16D2 extends toward the vehicle width direction inner side from a lower end portion of the upper side vertical portion 16D1. The lower side vertical portion 16D3 extends toward the vehicle lower side from a vehicle width direction inner side end portion of the middle horizontal portion 16D2 and is linked with a vehicle width direction inner side end portion of the lower wall portion 16B. A vertical direction dimension of the lower side vertical portion 16D3 is specified to be longer than a vertical direction dimension of the upper side vertical portion 16D1. Because the inner wall portion 16D is inflected in the crank shape as described above, a vehicle width direction dimension of the upper wall portion 16A is specified to be shorter than a vehicle width direction dimension of the lower wall portion 16B.

A vehicle width direction end portion (vehicle horizontal direction end portion) 14S of the floor pan 14 is superposed with an upper face of the middle horizontal portion 16D2 of the inner wall portion 16D. The floor pan 14 is fabricated by, for example, press-forming a plate constituted of a lightweight metal the same as the material of the rocker 16 (for example, an aluminium alloy). The vehicle width direction end portion 14S of the floor pan 14 is joined to the middle horizontal portion 16D2 by means such as spot welding, friction stir welding, riveting or the like. If the floor pan 14 is formed of a plate constituted of a different material from the material of the rocker 16 (for example, a steel plate), the floor pan 14 and the rocker 16 are joined by means such as bolt-fastening, riveting or the like.

An upper and lower pair of middle wall portions 16E and 16F, and a plural number (three in this exemplary embodiment) of dividing wall portions 16G, 16H and 16I are provided at a vertical direction middle portion of the rocker 16. The middle wall portions 16E and 16F span between the lower side vertical portion 16D3 of the inner wall portion 16D and the outer wall portion 16C. The dividing wall portions 16G, 16H and 16I link between the upper and lower middle wall portions 16E and 16F in the vehicle vertical direction. The three dividing wall portions 16G, 16H and 16I are arrayed with equal spacings or substantially equal spacings in the vehicle width direction. The middle wall portions 16E and 16F and dividing wall portions 16G, 16H and 16I structure an energy-absorbing portion 17 that is for absorbing energy of a side collision. The interior (chamber interior) of the rocker 16 is divided into an upper cavity 18 and a lower cavity 20 by the energy-absorbing portion 17. A cavity in the interior of the rocker 16 between the upper and lower middle wall portions 16E and 16F is divided into a plural number (four in this exemplary embodiment) of small cavities 22, 24, 26 and 28 by the three dividing wall portions 16G, 16H and 16I.

As shown in FIG. 2 and FIG. 3, the rocker 16 with the structure described above opposes the battery pack 40 in the vehicle width direction (the vehicle horizontal direction) with a gap 70 therebetween. Although only the vehicle left side portion is shown in FIG. 3, the structure of the battery mounting structure 10 according to the present exemplary embodiment has left-right symmetry at the left and right sides of the electric car 11.

—Structure of the Battery Pack 40—

As shown in FIG. 1 to FIG. 6, the battery pack 40 is provided with a battery case 42 that serves as an outer casing and plural battery modules 64 (not shown except in FIG. 3) that are accommodated inside the battery case 42. The battery modules 64 are structured by plural rectangular storage batteries.

The battery case 42 includes a rectangular frame-shaped periphery wall 46, a plate-shaped ceiling plate (lid) 48 and a plate-shaped floor plate 50. The battery case 42 is formed in a box shape that is longest in the vehicle front-and-rear direction and flattened in the vehicle vertical direction. The periphery wall 46 is structured by a left and right pair of side wall portions 46SW, a front wall portion 46FW, a rear wall portion 46RW, and four corner members 47. The left and right side wall portions 46SW, the front wall portion 46FW and the rear wall portion 46RW are extrusion-molded components fabricated by extrusion molding of, for example, a lightweight metal such as an aluminium alloy or the like. The four corner members 47 are fabricated by, for example, die-casting of a lightweight metal such as an aluminium alloy or the like.

The left and right side wall portions 46SW are formed in long, narrow shapes that are longest in the vehicle front-and-rear direction. The front wall portion 46FW and rear wall portion 46RW are formed in long, narrow shapes that are longest in the vehicle width direction. The left and right side wall portions 46SW, front wall portion 46FW and rear wall portion 46RW are formed substantially in a "B" shape (substantially in the shape of the Japanese character "凵") in cross-section as viewed in the length directions thereof (the directions of extrusion of the aforementioned extrusion-molded components). The left and right side wall portions 46SW, front wall portion 46FW and rear wall portion 46RW are each provided with an outer periphery wall portion 46A that forms an outer periphery face of the periphery wall 46, an inner periphery wall portion 46B that forms an inner periphery face of the periphery wall 46, an upper wall portion 46C that links upper end portions of the outer periphery wall portion 46A and inner periphery wall portion 46B in a vehicle horizontal direction, a lower wall portion 46D that links lower end portions of the outer periphery wall portion 46A and inner periphery wall portion 46B in the vehicle horizontal direction, and a dividing wall portion 46E that links vertical direction middle portions of the outer periphery wall portion 46A and inner periphery wall portion 46B in the vehicle horizontal direction. The dividing wall portion 46E divides (partitions) an interior portion of the left or right side wall portion 46SW, front wall portion 46FW or rear wall portion 46RW into an upper cavity 52 and a lower cavity 54.

The four corner members 47 are formed in substantially triangular column shapes that are longest in the vehicle vertical direction; cross sections seen in the length directions thereof form handfan shapes. The corner members 47 are disposed at the four corner portions of the battery case 42. Front end portions of the left and right side wall portions 46SW are joined to two vehicle width direction end portions of the front wall portion 46FW via the corresponding corner members 47, and rear end portions of the left and right side wall portions 46SW are joined to two vehicle width direction end portions of the rear wall portion 46RW via the corresponding corner members 47. Thus, the periphery wall 46 is formed in the rectangular frame shape. Means such as, for example, welding, friction spin welding, bolt-fastening, riveting or the like may be employed as a method for joining the side wall portions 46SW, front wall portion 46FW and rear wall portion 46RW to the corner members 47.

The ceiling plate 48 is formed by extrusion molding of a plate formed of, for example, a lightweight metal such as an aluminium alloy or the like. The ceiling plate 48 is fixed to upper faces of the upper wall portions 46C of the periphery wall 46 by plural bolts 53 (see FIG. 3). The floor plate 50 is formed by extrusion molding of a plate formed of, for example, a lightweight metal such as an aluminium alloy or the like. The floor plate 50 is joined to lower faces of the lower wall portions 46D of the periphery wall 46 by means such as welding, friction spin welding, bolt-fastening, riveting or the like. As shown in FIG. 1 and FIG. 3 to FIG. 6, a left and right pair of fixing flange portions (projecting portions) 50A are provided at both of vehicle width direction end portions of the floor plate 50. The fixing flange portions 50A project to vehicle outer sides in a vehicle horizontal direction (to vehicle width direction outer sides in this case) further than the left and right side wall portions 46SW of the periphery wall 46.

As shown in FIG. 3, the left and right fixing flange portions 50A are superposed with lower faces of the lower wall portions 16B of the left and right rockers 16. As shown in FIG. 1 and FIG. 3 to FIG. 6, plural bolt holes 56 arrayed in the vehicle front-and-rear direction (not shown in the drawing of FIG. 2) are formed in the left and right fixing flange portions 50A. As shown in FIG. 3, bolts 58 are inserted into the bolt holes 56 from the vehicle lower side. The bolts 58 are also inserted into bolt holes 60 formed in the lower wall portions 16B of the rockers 16, and threaded into nuts 62 that are disposed in the lower cavities 20 of the rockers 16. Thus, the left and right fixing flange portions 50A are joined (fixed) to the left and right rockers 16, and the battery case 42, which is to say the battery pack 40, is supported by the left and right rockers 16.

—Principal Portions of the Present Exemplary Embodiment—

In the battery mounting structure 10 according to the present exemplary embodiment, as described above, each of the fixing flange portions 50A (the floor plate 50), which projects further to the vehicle width direction outer side than the periphery wall 46 of the battery case 42, is joined to the rocker 16 (see FIG. 3) together with the vehicle width direction end portion 14S of the floor pan 14. The gap 70 is formed between the side wall portion 46SW of the battery case 42 and the lower side vertical portion 16D3 of the inner wall portion 16D of the rocker 16, that is, between the battery pack 40 and the rocker 16. The outer periphery wall portion 46A of the battery case 42 and the lower side vertical portion 16D3 of the rocker 16 oppose one another in the vehicle width direction, spaced apart by this gap 70. The gap 70 is partitioned from the vehicle exterior by the fixing flange portion 50A of the floor plate 50, and is partitioned from the interior of the vehicle cabin 13 by the floor pan 14.

A sealing member 80 for blocking noise (not shown in the drawing of FIG. 2) is disposed in the above-described gap 70. The sealing member 80 is fabricated of, for example, a rubber such as EPDM (ethylene-propylene diene rubber) or the like, or a resin such as TPO (an olefin-based elastomer) or the like. The sealing member 80 has resilience. The sealing member 80 is fabricated by, for example, extrusion molding and is formed in a long, narrow shape that is longest in the vehicle front-and-rear direction. A length dimension of the sealing member 80 is specified to be equal to a length dimension of the side wall portion 46SW of the battery case 42.

A cross section of the sealing member 80 viewed in the length direction thereof (the vehicle front-and-rear direction) forms a long, narrow shape that is longer in the vehicle width direction. The sealing member 80 is provided with a sealing portion 80A that is disposed in the gap 70 and a fixed portion (first fitting portion) 80B that structures a region at the vehicle width direction inner side of the sealing member 80 relative to the sealing portion 80A. Flange portions 80A1 and 80A2 (not marked with reference symbols except in FIG. 6) that extend upward and downward are formed at a proximal end portion (a vehicle width direction inner side end portion) of the sealing portion 80A. In cross section, the fixed portion 80B widens upward and downward at the vehicle width direction inner side relative to the vehicle width direction outer side thereof.

A groove 90 extending in the vehicle front-and-rear direction is formed in the side wall portion 46SW of the battery case 42 to correspond with the above-mentioned sealing member 80. The groove 90 is formed in the outer periphery wall portion 46A of the side wall portion 46SW (in the lower portion of the outer periphery wall portion 46A in this exemplary embodiment). The groove 90 opens toward the vehicle width direction outer side and is formed over the whole length of the side wall portion 46SW in the length direction thereof. The groove 90 is formed by, for example, when the side wall portion 46SW is being extrusion-molded, a portion of the outer periphery wall portion 46A being evaginated toward the inner side of the side wall portion 46SW in a substantial "U" shape in cross section. A cross section of the groove 90 widens upward and downward at a floor portion side relative to the opening side thereof. The fixed portion 80B of the sealing member 80 is fitted into (engaged with) the groove 90. Hence, the sealing member 80 is retained at (attached to) the side wall portion 46SW.

The upper and lower flange portions 80A1 and 80A2 provided at the proximal end portion of the sealing portion 80A touch against the vehicle width direction outer side face of the outer periphery wall portion 46A (the side wall portion 46SW). A distal end portion (vehicle width direction outer side end portion) of the sealing portion 80A is pressed against the lower side vertical portion 16D3 of the rocker 16. As a result, the sealing portion 80A is curved (resiliently deformed) so as to approach the vehicle lower side toward the vehicle width direction outer side. The gap 70 is plugged in the vehicle vertical direction by the sealing portion 80A over the whole range or substantially the whole range thereof in the vehicle front-and-rear direction (for example, a region excluding both vehicle front-and-rear direction end portions of the gap 70).

Figure 4:
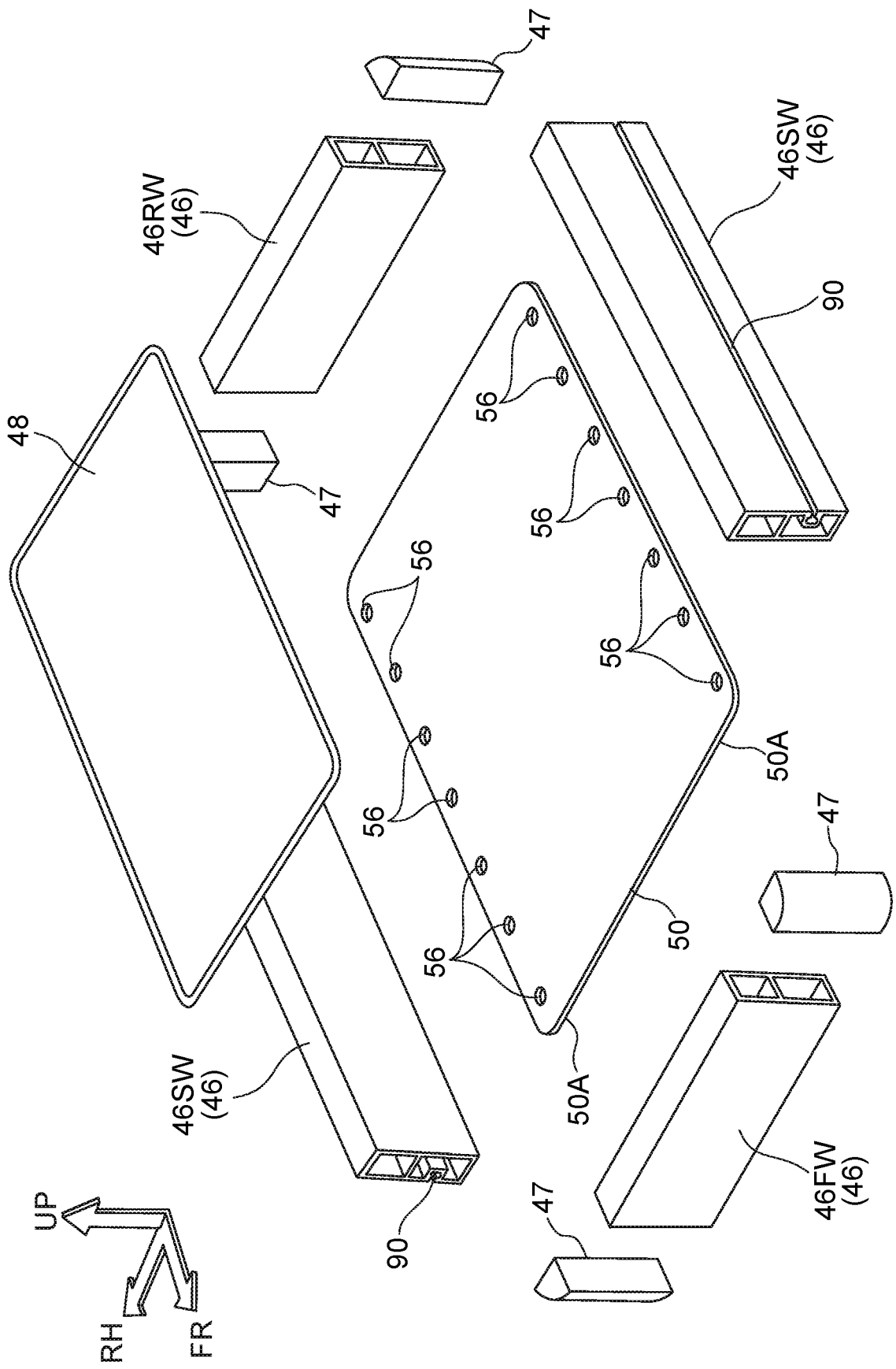
FIG. 4 is an exploded perspective view of a battery case, which is an outer casing of the battery pack.
Figure 5:
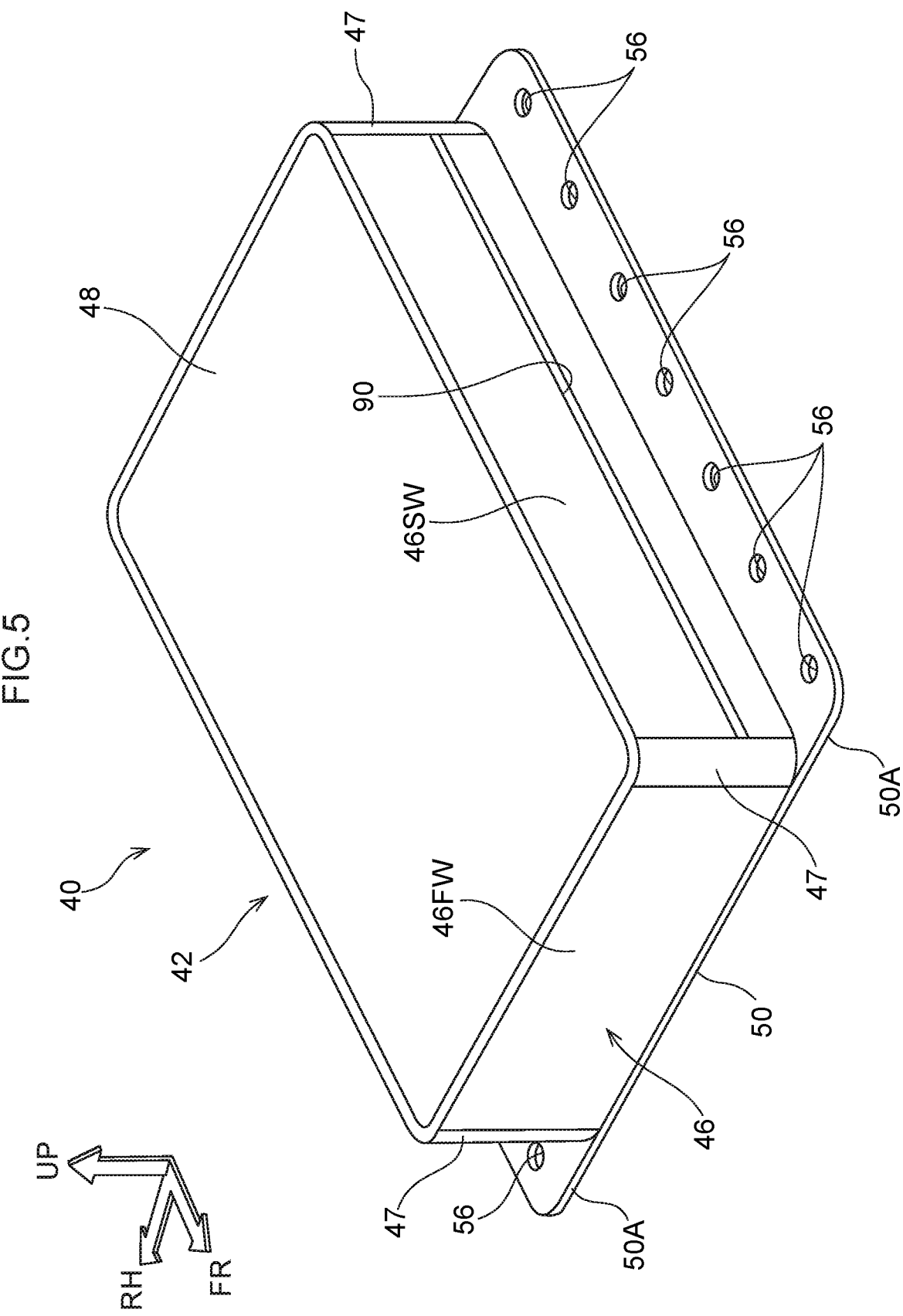
FIG. 5 is a perspective view showing a completed state of the battery case.
Figure 6:
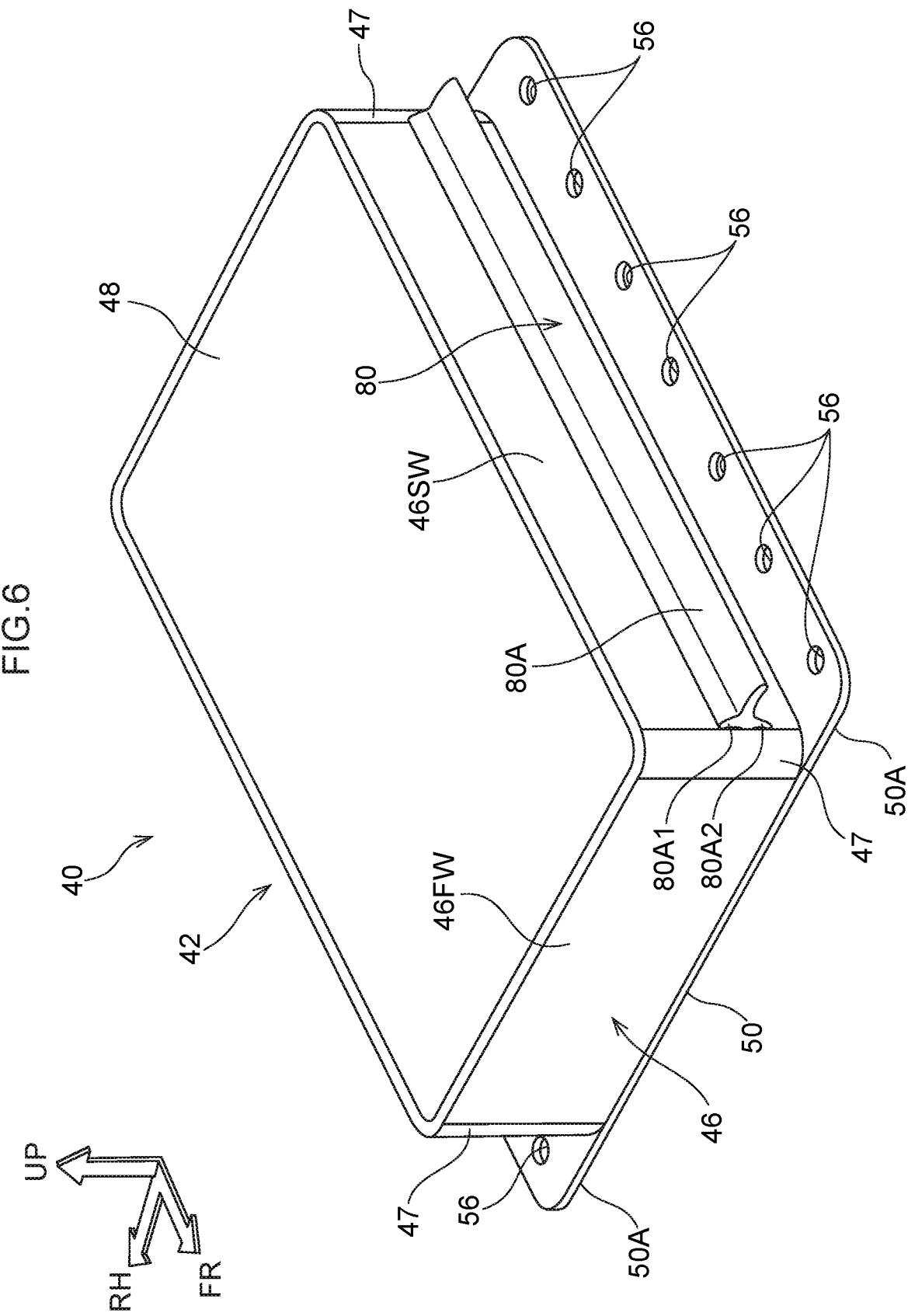
FIG. 6 is a perspective view showing a state in which a sealing member is attached to the battery case.

The sealing member 80 described above is a structure that is attached to each side wall portion 46SW of the battery case 42 before the battery pack 40 is mounted to the vehicle body 12. More specifically, first, the structural members of the battery case 42 are joined to one another as shown in FIG. 4 and the battery case 42 shown in FIG. 5 is fabricated. Then, the fixed portion 80B of each sealing member 80 is engaged with the groove 90 of the side wall portion 46SW, attaching the sealing members 80 to the battery case 42. Subsequently, the battery pack 40 is mounted to the underfloor of the vehicle body 12 as indicated by the arrow IN in FIG. 1. At this time, the floor plate 50 of the battery case 42 is bolt-fastened to the left and right rockers 16, and the distal end portions of the sealing portions 80A of the sealing members 80 abut against the rockers 16. Thus, the gaps 70 are plugged by the sealing portions 80A.

—Operation and Effects—

Now, operation and effects of the first exemplary embodiment are described.

In the battery mounting structure 10 with the structure described above, the battery pack 40 is mounted below the floor pan 14 of the vehicle cabin 13 and the rockers 16 are joined to the vehicle width direction end portions of the floor pan 14. The gaps 70 between the rockers 16 and the battery pack 40 are plugged by the sealing members 80 that have resilience. Thus, noise intruding into the vehicle cabin 13 from below the floor may be moderated with a simple structure.

Figure 7:
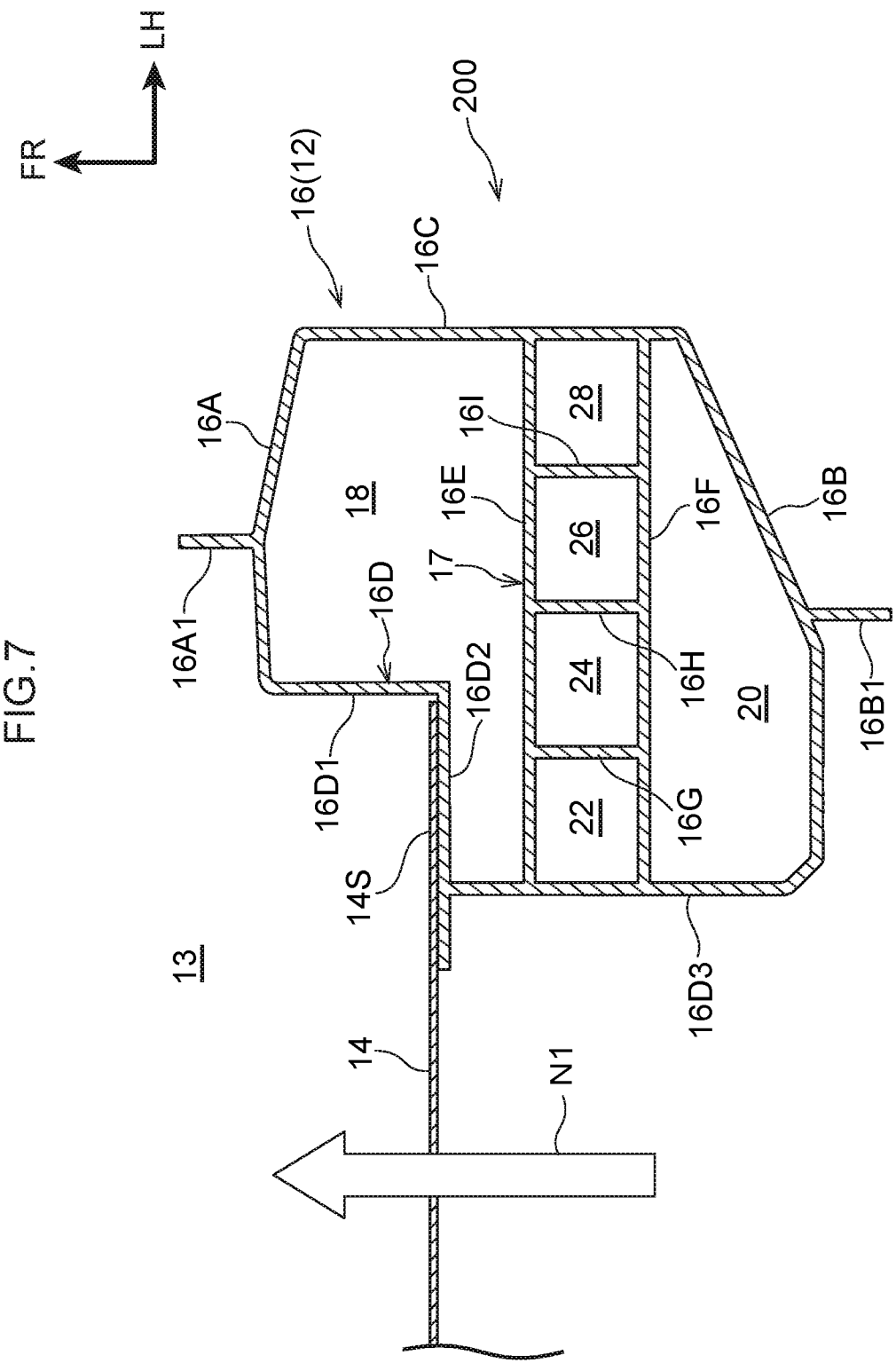
FIG. 7 is a sectional diagram, corresponding to FIG. 3, showing a first comparative example.
Figure 8:
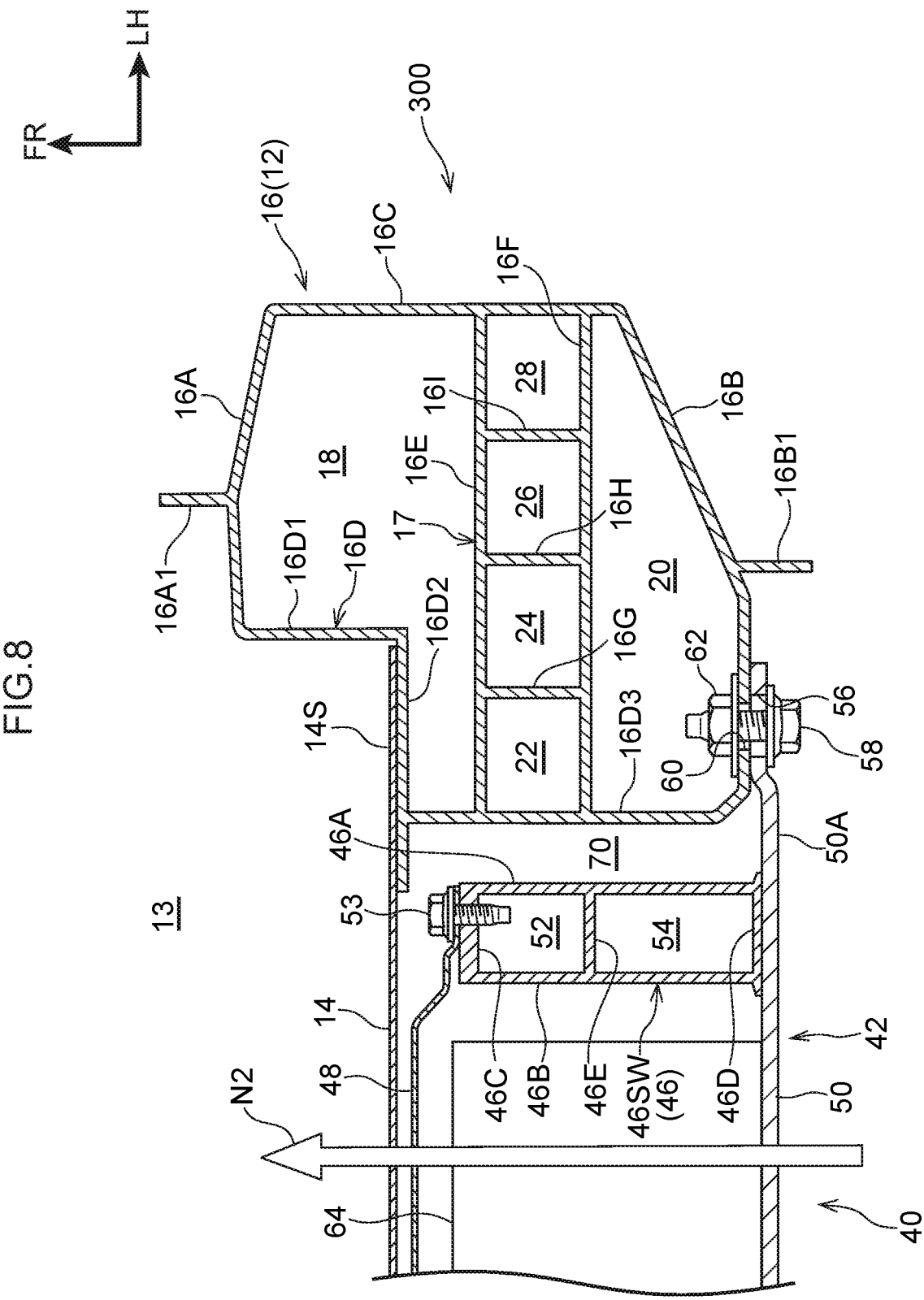
FIG. 8 is a sectional diagram, corresponding to FIG. 3, showing a second comparative example and is a diagram for describing an effect of the battery case moderating noise intrusion into a vehicle cabin.
Figure 9:
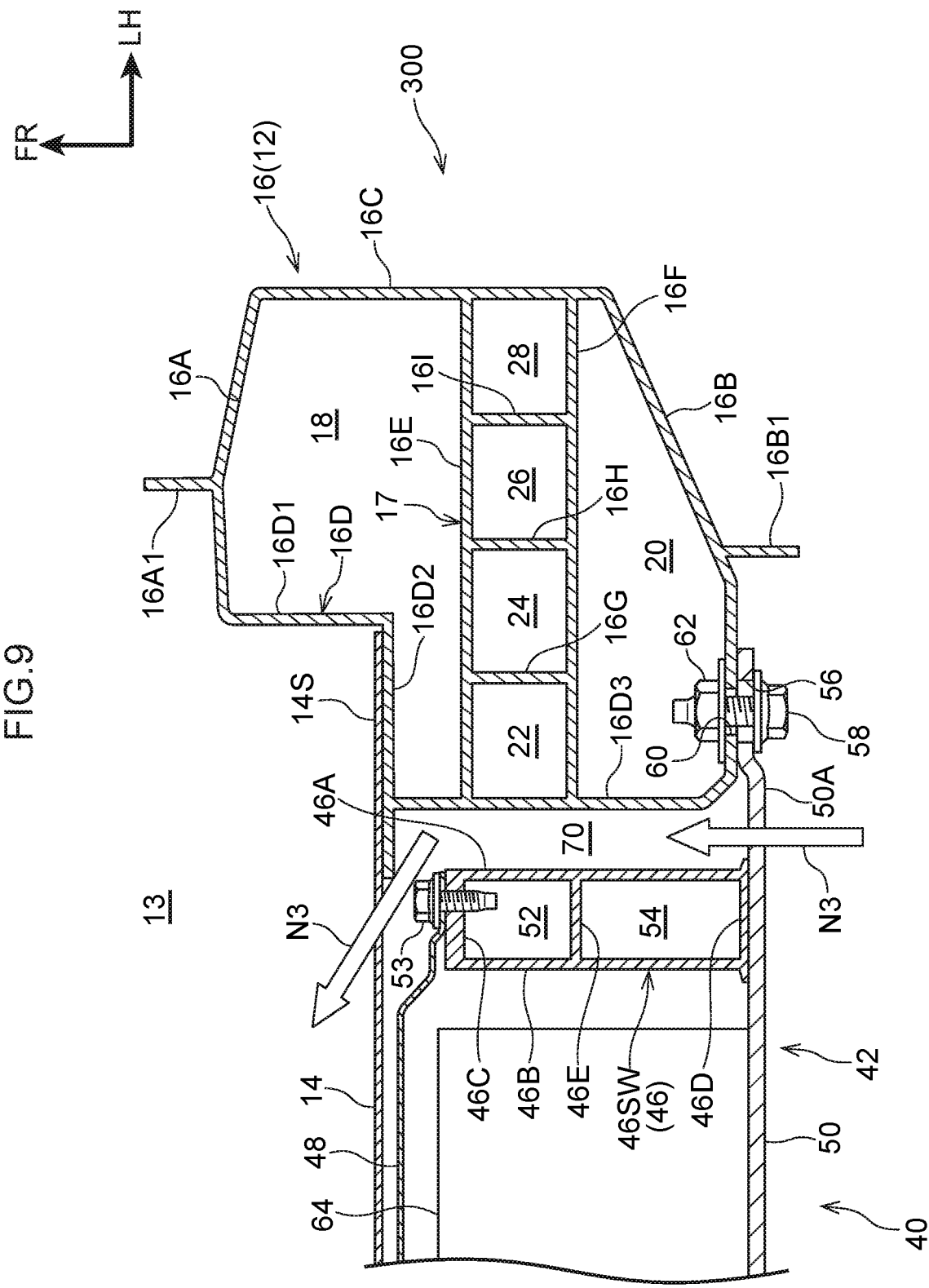
FIG. 9 is a sectional diagram, corresponding to FIG. 3, showing a second comparative example and is a diagram for describing noise intruding into the vehicle cabin through a gap between the battery case and a rocker.

A supplementary description of the effect described above is given using a first comparative example 200 illustrated in FIG. 7 and a second comparative example 300 illustrated in FIG. 8 and FIG. 9. In FIG. 7 to FIG. 9, structures that are the same as in the present exemplary embodiment are assigned the same reference symbols. The first comparative example 200 shown in FIG. 7 is a vehicle in which no battery pack is mounted at the lower side of the floor pan 14 (for example, a gasoline engine car). In the first comparative example 200, the single floor pan 14 is the only dividing wall separating the vehicle exterior from the vehicle cabin 13 interior at the floor portion of the vehicle cabin 13. Therefore, it is easier for noise from below the floor to intrude into the vehicle cabin 13 (see arrow N1 in FIG. 7). Consequently, in order to suppress (moderate) the intrusion of noise into the vehicle cabin 13, a measure such as increasing a plate thickness of the floor pan 14, setting a noise-absorbing material over the floor pan 14, or the like is required.

In contrast, the second comparative example 300 shown in FIG. 8 and FIG. 9 is a battery mounting structure in which the battery pack 40 is mounted at the lower side of the floor pan 14 in a similar manner to the present exemplary embodiment. In the second comparative example 300, the battery case 42 of the battery pack 40 is provided with the ceiling plate 48 and the floor plate 50. Therefore, three dividing walls—the ceiling plate 48, the floor plate 50 and the floor pan 14—are present at the floor portion of the vehicle cabin 13. Thus, the three dividing walls function as noise-blocking members that suppress the intrusion of noise into the vehicle cabin 13 (see arrow N2 in FIG. 8). However, noise that passes through the gap 70 between the battery pack 40 and each rocker 16 and intrudes into the vehicle cabin 13 (see arrow N3 in FIG. 9) only passes through two dividing walls—the floor plate 50 and the floor pan 14. Therefore, noise intrusion into the vehicle cabin 13 is not thoroughly suppressed.

In the present exemplary embodiment, however, noise passing through the gap 70 between the battery pack 40 and each rocker 16 and intruding into the vehicle cabin 13 passes through three dividing walls—the floor plate 50, the sealing member 80 and the floor pan 14. Therefore, noise intrusion into the vehicle cabin 13 may be thoroughly suppressed and, accordingly, the plate thickness of the floor pan 14 may be reduced, a noise-absorbing material over the floor pan 14 may be reduced or eliminated, and the like.

In the present exemplary embodiment, each sealing member 80 is retained at the battery pack 40 by the fixed portion 80B formed at the sealing member 80 being fitted into the groove 90 (a second fitting portion) formed at the battery case 42 of the battery pack 40. Therefore, the sealing member 80 may be retained at the battery pack 40 before the battery pack 40 is mounted to the vehicle, and an operation for assembly of the sealing member 80 after the battery pack 40 has been mounted to the vehicle is unnecessary.

The battery pack 40 described above includes the side wall portions 46SW that are extrusion-molded components. Each groove 90 is formed in the corresponding side wall portion 46SW (extrusion-molded component). The groove 90 is formed along the extrusion direction of the side wall portion 46SW and the groove 90 is formed during the extrusion molding of the side wall portion 46SW. Therefore, a dedicated process for forming the groove 90 is unnecessary.

In the present exemplary embodiment, as well as the gap 70 between the battery case 42 and each rocker 16 being plugged by the sealing member 80, the gap 70 is partitioned from the vehicle exterior by the floor plate 50 of the battery case 42. Therefore, noise intruding into the vehicle cabin 13 from below the floor may be further moderated.

—Variant Examples of the First Exemplary Embodiment—

Now, a range of variant examples of the first exemplary embodiment are described using FIG. 10 to FIG. 13. Structures and operations that are basically the same as in the first exemplary embodiment are assigned the same reference numerals as in the first exemplary embodiment and are not described.

Figure 10:
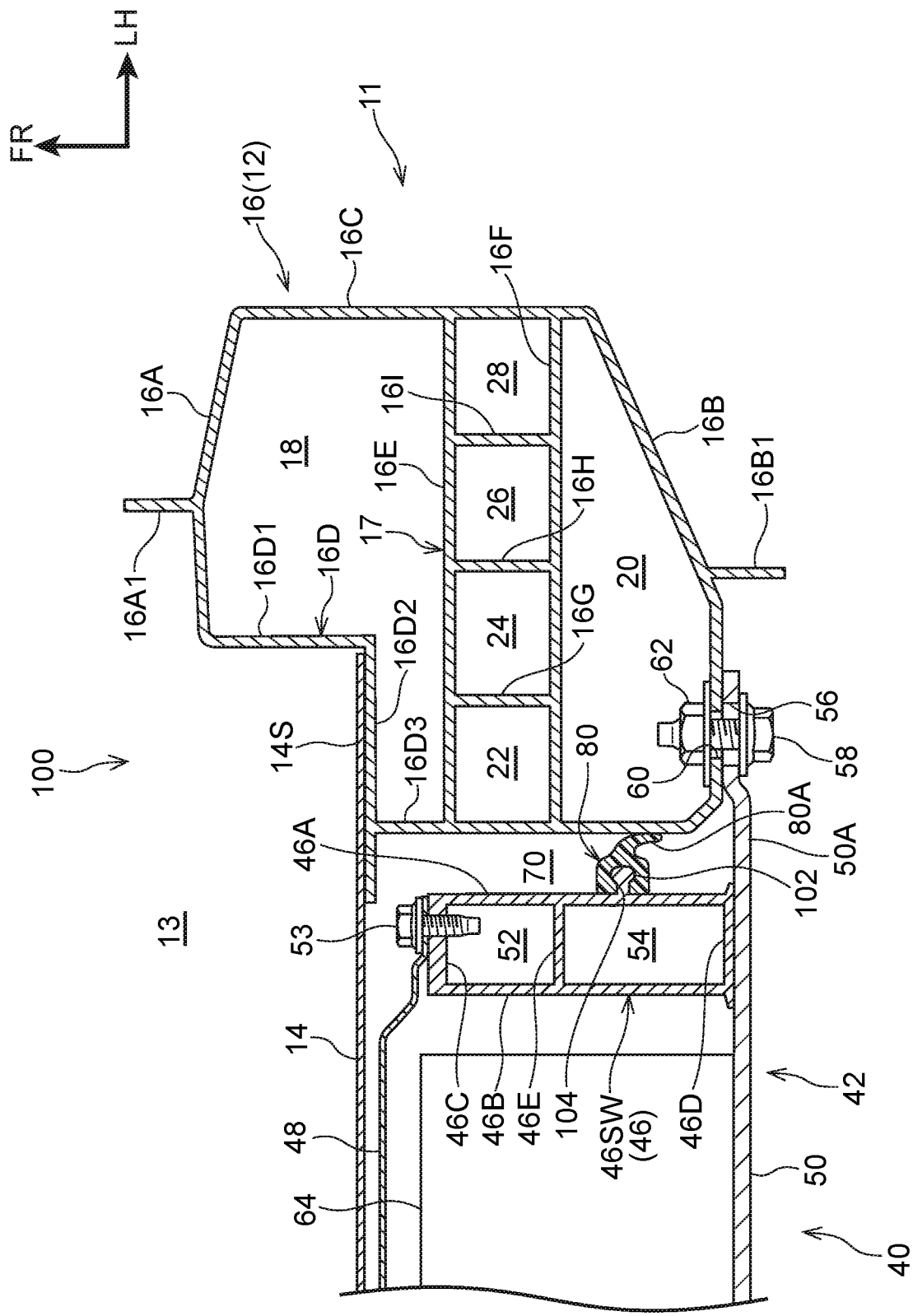
FIG. 10 is a sectional diagram, corresponding to FIG. 3, showing a first variant example of the first exemplary embodiment of the present disclosure.

In a first variant example 100 shown in FIG. 10, a projection 102 (the second fitting portion) is formed at each side wall portion 46SW of the battery case 42, and the projection 102 fits into a groove 104 (a first fitting portion) formed in a vehicle width direction inner side portion of the sealing member 80. Thus, the sealing member 80 is retained at the battery case 42 (the battery pack 40). The projection 102 is formed, for example, when the side wall portion 46SW is being extrusion-molded, and the projection 102 extends over the whole length of the side wall portion 46SW in the length direction thereof. The groove 104 is formed, for example, when the sealing member is being extrusion molded and extends over the whole length of the sealing member 80 in the length direction thereof. The same operational effects as in the first exemplary embodiment are also provided by the first variant example 100.

Figure 11:
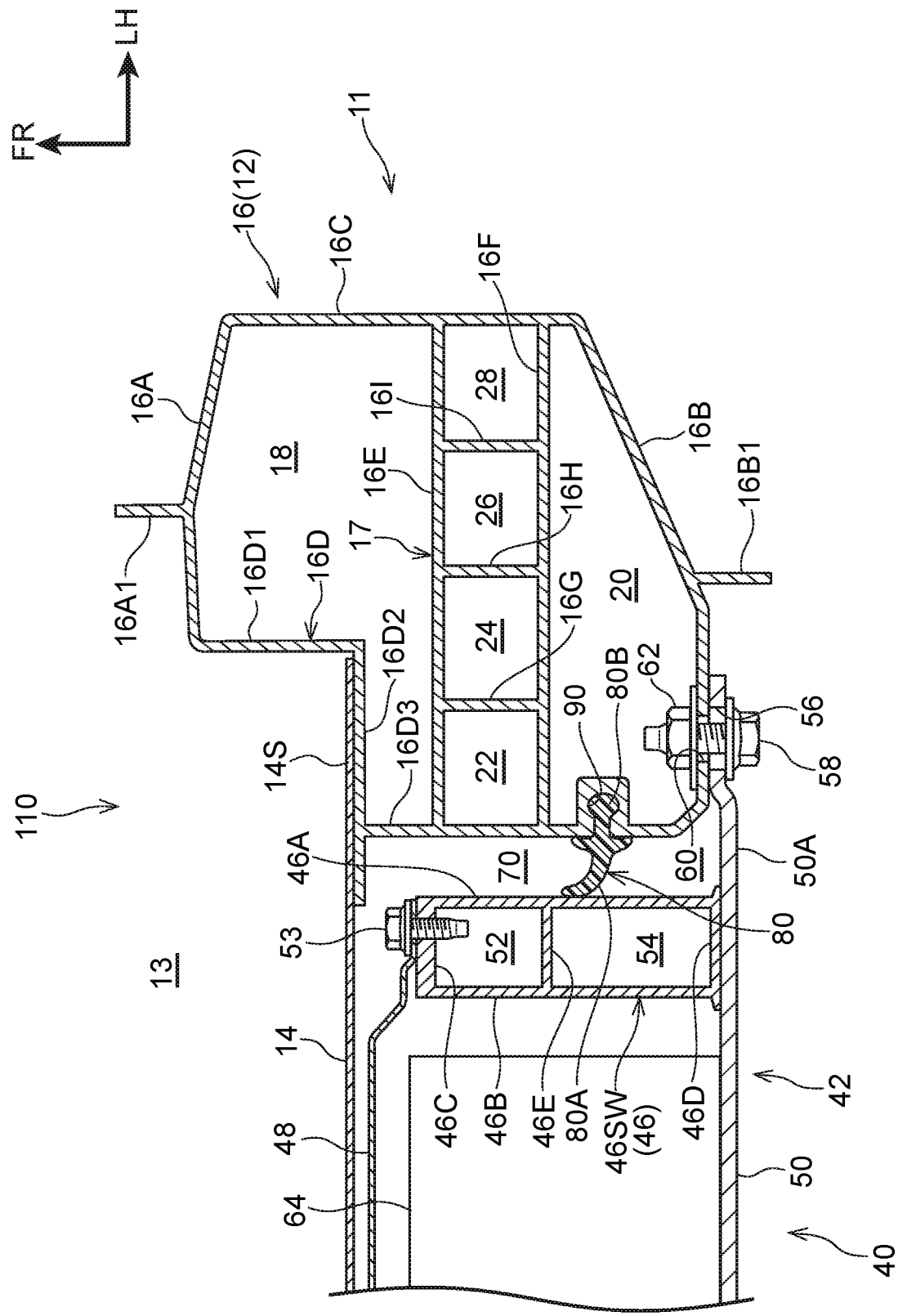
FIG. 11 is a sectional diagram, corresponding to FIG. 3, showing a second variant example of the first exemplary embodiment of the present disclosure.

In a second variant example 110 shown in FIG. 11, the groove 90 is formed in the lower side vertical portion 16D3 of the inner wall portion 16D of each rocker 16, and the fixed portion 80B of the sealing member 80 is fitted into the groove 90. Thus, the sealing member 80 is retained at the rocker 16. The distal end portion of the sealing portion 80A of the sealing member 80 is pressed against the side wall portion 46SW of the battery case 42. As a result, the sealing portion 80A is curved (resiliently deformed) so as to approach the vehicle upper side toward the vehicle width direction inner side. The same operational effects as in the first exemplary embodiment are also provided by the second variant example 110.

Figure 12:
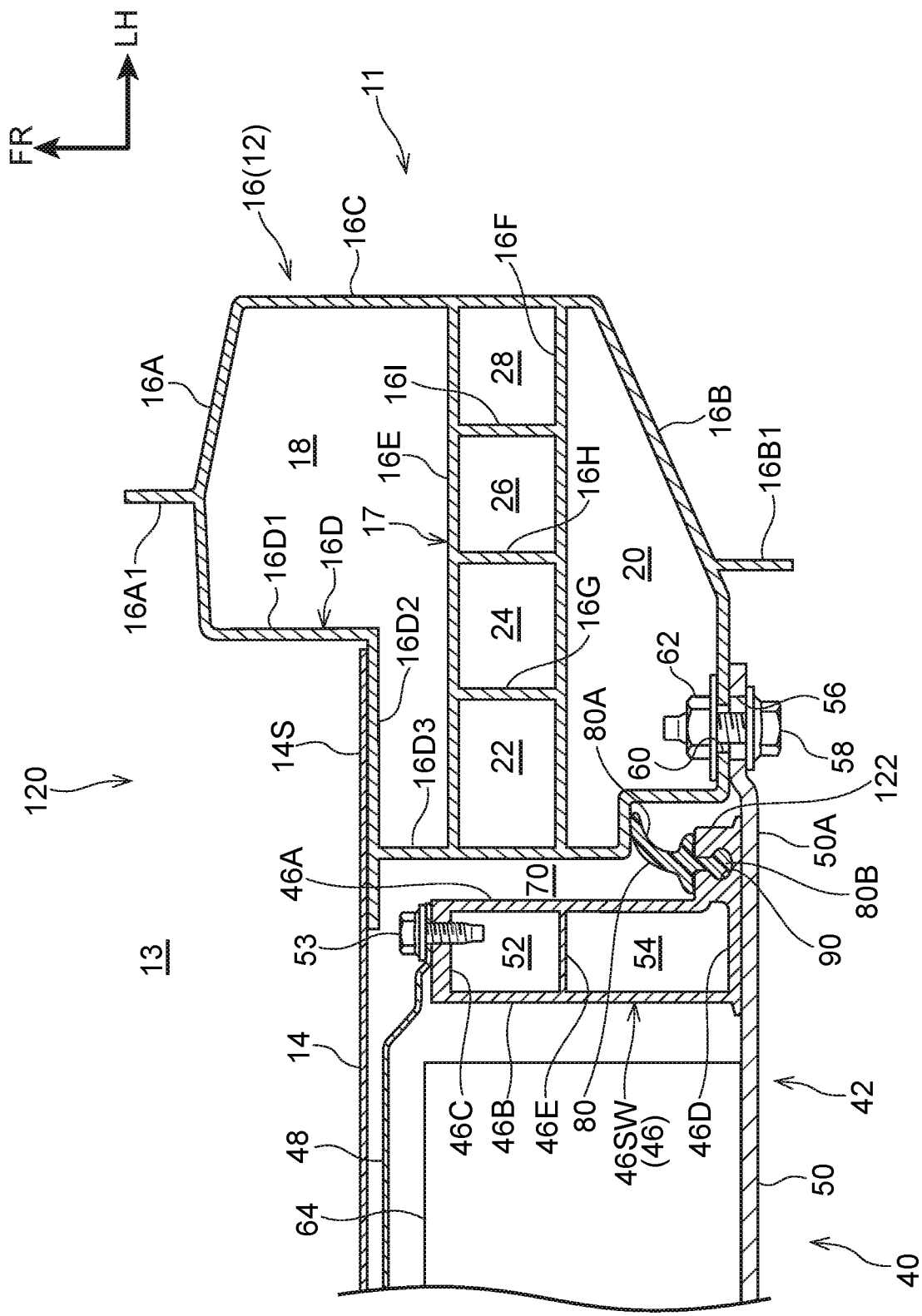
FIG. 12 is a sectional diagram, corresponding to FIG. 3, showing a third variant example of the first exemplary embodiment of the present disclosure.

In a third variant example 120 shown in FIG. 12, a projection portion 122 is formed projecting toward the vehicle width direction outer side from a lower end portion of each side wall portion 46SW of the battery case 42. The groove 90 is formed in the projection portion 122, opening at an upper face of the projection portion 122 and extending in the vehicle front-and-rear direction. The groove 90 is formed to extend over the whole length of the side wall portion 46SW in the length direction thereof. The fixed portion 80B of the sealing member 80 fits into this groove 90. Hence, the sealing member 80 is retained at the side wall portion 46SW. A step portion (to which no reference symbol is assigned) recessed toward the vehicle width direction outer side is formed at a lower end portion of the lower side vertical portion 16D3 of the rocker 16. A distal end portion of the sealing portion 80A is pressed against the step portion from the lower side. The sealing portion 80A is curved (resiliently deformed) so as to approach the vehicle width direction outer side toward the vehicle upper side. The same operational effects as in the first exemplary embodiment are also provided by the third variant example 120.

Figure 13:
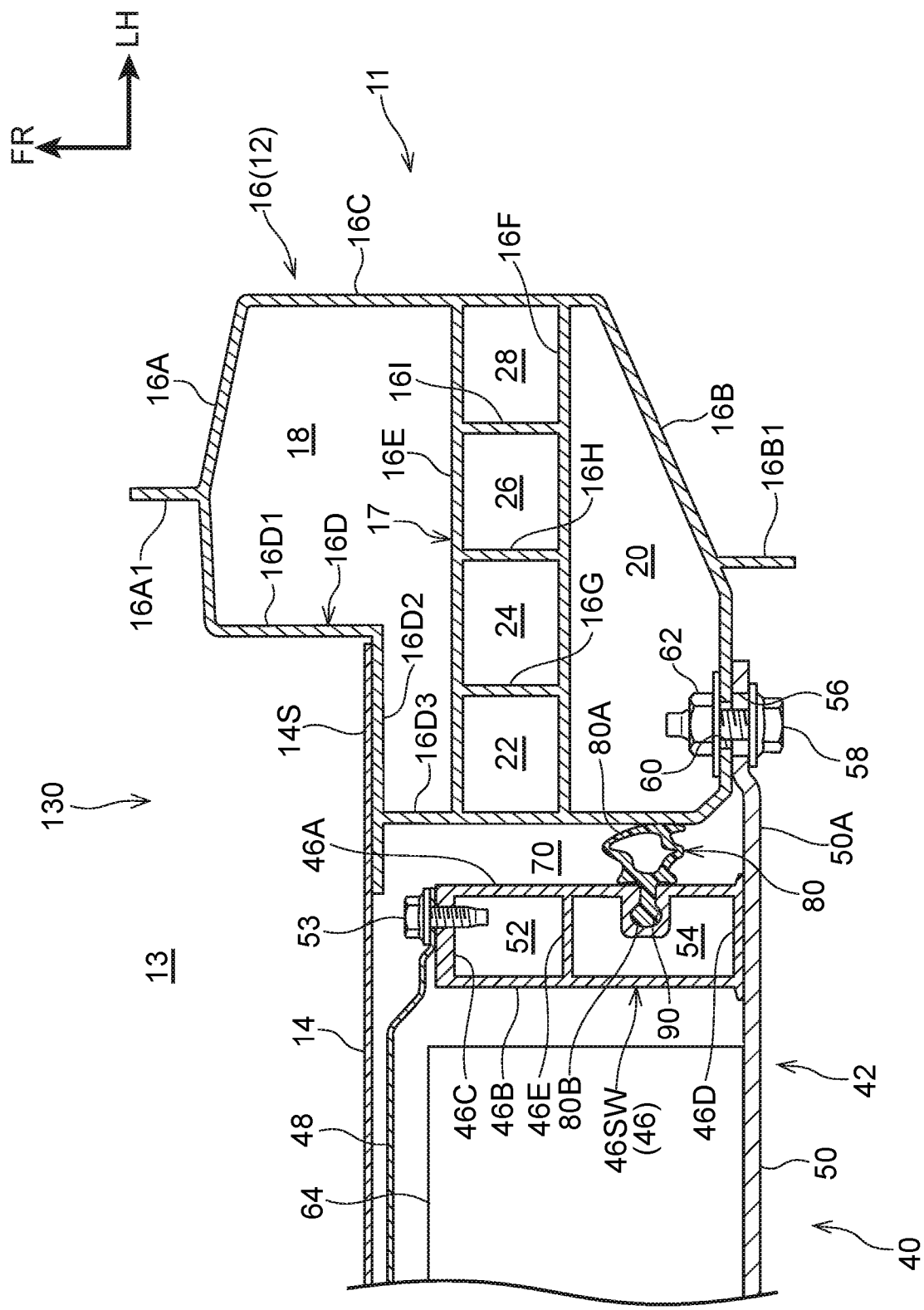
FIG. 13 is a sectional diagram, corresponding to FIG. 3, showing a fourth variant example of the first exemplary embodiment of the present disclosure.

In a fourth variant example 130 shown in FIG. 13, the sealing portion 80A of each sealing member 80 is formed in a hollow shape. The sealing portion 80A forms a chamber extending in the vehicle front-and-rear direction, being sandwiched between the rocker 16 and the side wall portion 46SW in a state in which the sealing portion 80A is resiliently deformed in the vehicle width direction. The same operational effects as in the first exemplary embodiment are also provided by the fourth variant example 130.

Now, alternative exemplary embodiments of the present disclosure are described. Structures and operations that are basically the same as in the first exemplary embodiment are assigned the same reference numerals as in the first exemplary embodiment and are not described.

Second Exemplary Embodiment

Figure 14:
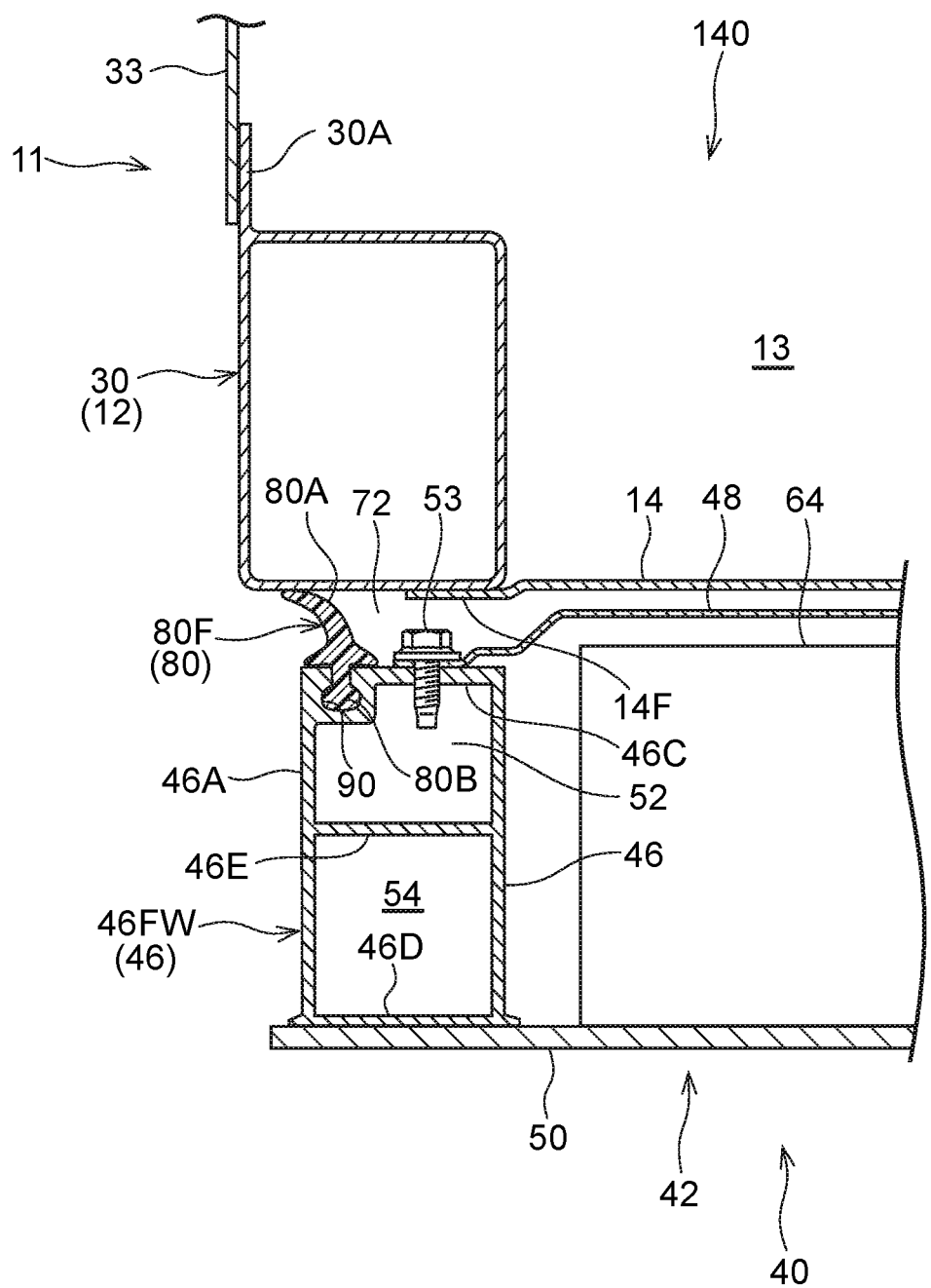
FIG. 14 is a sectional diagram showing a battery mounting structure according to a second exemplary embodiment of the present disclosure and is a diagram corresponding to a sectional diagram cut along line F14-F14 in FIG. 2.

FIG. 14 is a sectional diagram showing a battery mounting structure 140 according to a second exemplary embodiment of the present disclosure, corresponding to a sectional diagram cut along line F14-F14 in FIG. 2. In this exemplary embodiment, the front cross-member 30 (see FIG. 2 and FIG. 14) and the rear cross-member 32 (see FIG. 2) serve as the vehicle body framework member of the present disclosure. The front cross-member 30 and the rear cross-member 32 are formed in long, narrow shapes that are longest in the vehicle width direction, and are formed as substantially rectangular chambers extending in the vehicle width direction.

As shown in FIG. 14, a front end portion 14F (vehicle horizontal direction end portion) of the floor pan 14 is joined to the rear end side of a lower face of the front cross-member 30. The front wall portion 46FW of the battery case 42 (see FIG. 14 and FIG. 15) is disposed close to the front cross-member 30 below the front cross-member 30. A flange portion 30A extending toward the vehicle upper side is provided at a front end portion of the front cross-member 30. A lower end portion of a dash panel 33 is joined to the flange portion 30A. Further, although not shown in the drawings, a rear end portion (vehicle horizontal direction end portion) of the floor pan 14 is joined to the front end side of a lower face of the rear cross-member 32. The rear wall portion 46RW of the battery case 42 (see FIG. 15) is disposed close to the rear cross-member 32 below the rear cross-member 32.

As shown in FIG. 14, a gap 72 is formed between the front wall portion 46FW of the battery case 42 and the front cross-member 30. Another of the sealing member 80 (not shown in FIG. 2; below referred to as "the sealing member 80F") is disposed at the front portion side of the gap 72. Another of the groove 90 extending in the vehicle width direction is formed in an upper end portion of the front wall portion 46FW to correspond with the sealing member 80F. The groove 90 opens toward the vehicle upper side and is formed over the whole length in the length direction of the front wall portion 46FW. The groove 90 is formed, for example, when the front wall portion 46FW is being extrusion-molded. The fixed portion 80B of the sealing member 80F fits into (engages with) the groove 90. Hence, the sealing member 80F is retained at the front wall portion 46FW. The distal end portion (upper end portion) of the sealing portion 80A of the sealing member 80F is pressed against the lower face of the front cross-member 30. The gap 72 is plugged in the vehicle front-and-rear direction by the sealing member 80 over the whole range or substantially the whole range thereof in the vehicle width direction (for example, a region excluding both vehicle width direction end portions of the gap 72).

Figure 15:
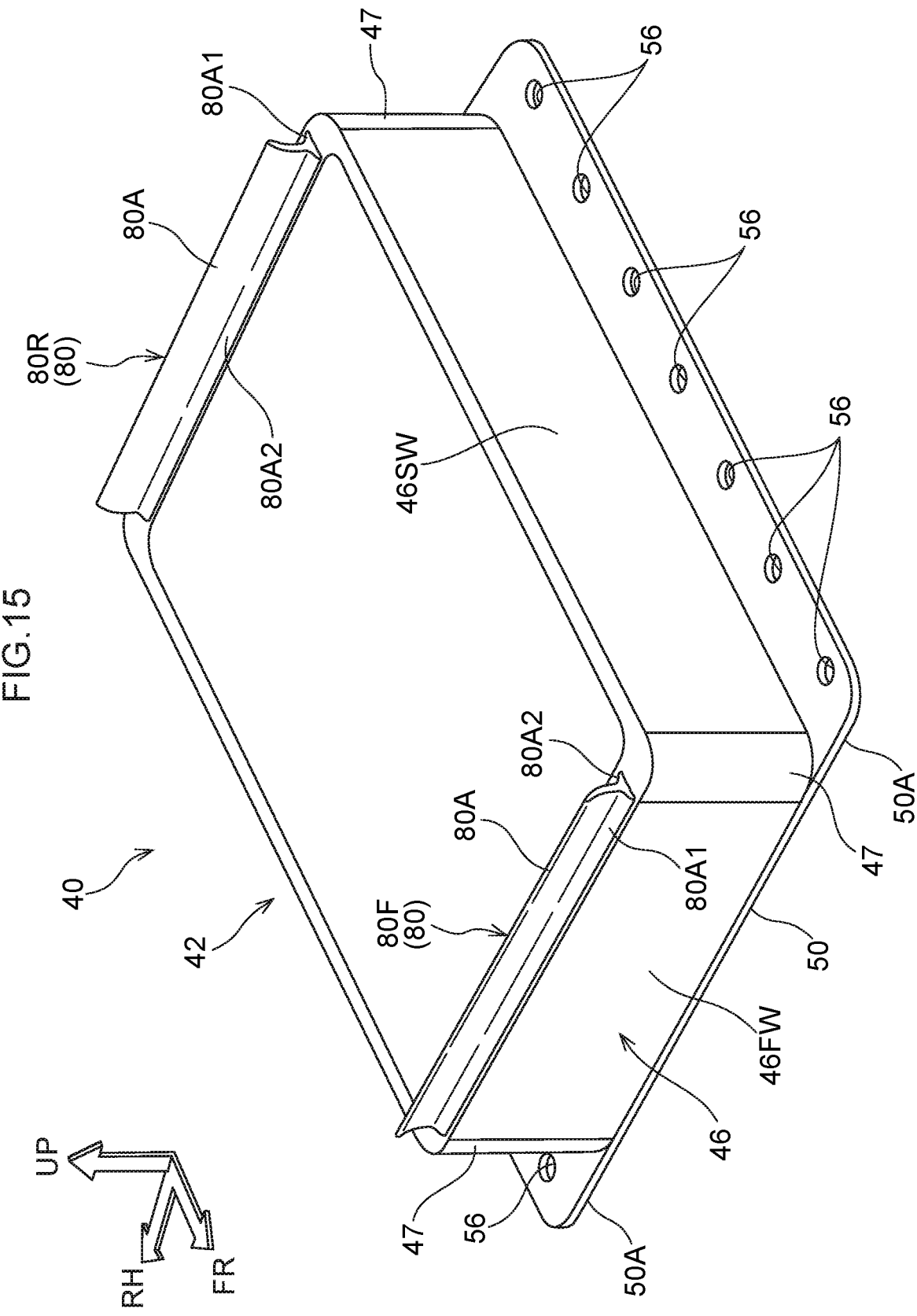
FIG. 15 is a perspective view showing structures of a battery pack and sealing members according to the second exemplary embodiment.

As shown in FIG. 15, yet another of the sealing member 80 (not shown in FIG. 2; below referred to as "the sealing member 80R") is attached to an upper end portion of the rear wall portion 46RW of the battery case 42. The sealing member 80R is attached to the rear wall portion 46RW by the same method as the method of attachment of the sealing member 80F to the front wall portion 46FW. The sealing member 80R is provided with the sealing portion 80A, which is disposed in a gap 74 (see FIG. 2) between the rear cross-member 32 (see FIG. 2) and the rear wall portion 46RW. The distal end portion (upper end portion) of the sealing portion 80A of the sealing member 80R is pressed against the lower face of the rear cross-member 32. The gap 74 is plugged by the sealing member 80R over the whole range or substantially the whole range thereof in the vehicle width direction (for example, a region excluding both vehicle width direction end portions of the gap 74). The sealing members 80F and 80R described above are attached to the battery case 42 (see FIG. 15) before the battery pack 40 is mounted to the vehicle body 12. Apart from the above descriptions, structures of this exemplary embodiment are similar to the first exemplary embodiment.

Figure 16:
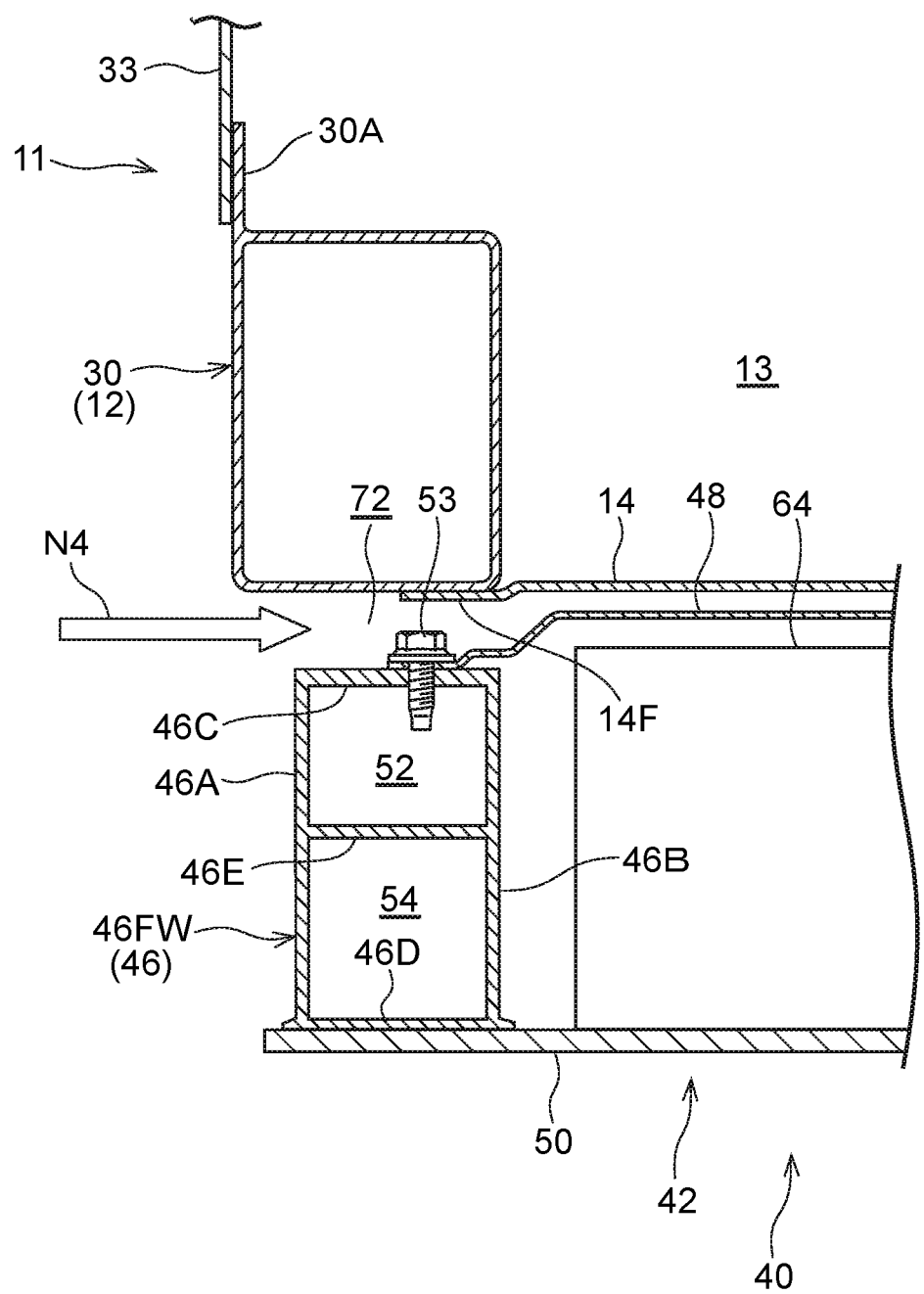
FIG. 16 is a sectional diagram, corresponding with FIG. 14, showing a third comparative example.

In this exemplary embodiment, the gap 72 between the front cross-member 30 and the battery pack 40 and the gap 74 between the rear cross-member 32 and the battery pack 40 are plugged by the sealing members 80F and 80R that have resilience. Therefore, noise passing through the gap 72 and intruding into the vehicle cabin 13 (see arrow N4 in FIG. 16) and noise passing through the gap 74 and intruding into the vehicle cabin 13 (not depicted in the drawings) may be blocked by the sealing members 80F and 80R. Thus, in this exemplary embodiment, similarly to the first exemplary embodiment, noise intruding into the vehicle cabin 13 from below the floor may be moderated with a simple structure.

=Supplementary Descriptions of the Exemplary Embodiments=

In the first exemplary embodiment, the rockers 16 serve as the vehicle body framework member of the present disclosure, and in the second exemplary embodiment, the front cross-member 30 and the rear cross-member 32 serve as the vehicle body framework member of the present disclosure, but these are not limiting. The rockers 16, the front cross-member 30 and the rear cross-member 32 may all serve as the vehicle body framework member of the present disclosure, and the sealing member 80 may be disposed in all of the gaps 70, 72 and 74. Further, when a battery pack (battery unit) is a structure to be mounted between left and right side members as in the battery-equipped vehicle described in the Related Art section, the left and right side members may serve as the vehicle body framework member of the present disclosure.

In the above exemplary embodiments, one of the sealing member 80 is disposed in each of the gaps 70, 72 and 74, but this is not limiting. In the present disclosure, structures are possible in which plural sealing members are disposed in a gap between the battery pack and a vehicle body framework member. In this case, the effect of moderating noise intrusion into the vehicle cabin may be enhanced by disposing the sealing members in an array in the direction of intrusion of noise through the gap.

In the above exemplary embodiments, examples are depicted in which the groove 90 or projection 102 serves as the second fitting portion and is formed in the side wall portion 46SW, front wall portion 46FW, rear wall portion 46RW or rocker 16 that is an extrusion-molded component. However, this is not limiting. Structures are possible in which a groove or projection is formed to serve as the second fitting portion in a member that is fabricated by a fabrication method other than extrusion molding. Moreover, the second fitting portion is not limited to a groove or projection but may be, for example, plural holes or plural protrusions. When the second fitting portion is plural holes, the first fitting portion of the sealing member is formed as plural protrusions, and when the second fitting portion is plural protrusions, the first fitting portion of the sealing member is formed as plural holes.

In the above exemplary embodiments, the sealing member 80 is retained at (attached to) one structure of the battery pack 40 or the vehicle body framework member (the rocker 16, the front cross-member 30 or the rear cross-member 32) by the fixed portion 80B or groove 104 formed at the sealing member 80 being fitted to the groove 90 or projection 102 formed at the one structure. However, the present disclosure is not limited thus. A method for attaching the sealing member to the one structure may be modified as appropriate. For example, structures are possible in which the sealing member is attached to the battery pack or vehicle body framework member by adhesion. Further structures are possible in which the sealing member is not retained at the battery pack or the vehicle body framework member; that is, the battery pack is mounted at the vehicle body and subsequently the sealing member is tightly fitted in between the battery pack and the vehicle body framework member.

In the above exemplary embodiments, each gap 70 is partitioned from the vehicle exterior by the fixing flange portion 50A of the floor plate 50 of the battery case 42, but this is not limiting. Structures are possible in which the gap 70 is in fluid communication with the vehicle exterior.

In the above exemplary embodiments, a case in which the present disclosure is applied to the sedan-type electric car 11 is described, but this is not limiting. The present disclosure may be applied to vehicles of types other the sedan type and to hybrid cars and the like, provided the battery mounting structure mounts a battery pack below a floor pan.

It will be clear that numerous modes may be embodied within a scope that does not depart from the gist of the present disclosure. It will also be clear that the present disclosure is not to be limited to the exemplary embodiments described above.

What is claimed is:

1. A battery mounting structure, comprising:
   a battery pack mounted below a floor pan of a vehicle cabin;
   a vehicle body framework member to which a vehicle horizontal direction end portion of the floor pan is joined; and
   a sealing member that has resilience and that plugs a gap between the battery pack and the vehicle body framework member,
   wherein a first fitting portion formed at the sealing member is fitted together with a second fitting portion formed at one of the battery pack or the vehicle body framework member, and the sealing member is retained at the one of the battery pack or the vehicle body framework member.

2. The battery mounting structure according to claim 1, wherein the one of the battery pack or the vehicle body framework member comprises an extrusion-molded component, and the second fitting portion comprises a groove or projection formed at the extrusion-molded component along an extrusion direction of the extrusion-molded component.

3. A battery mounting structure, comprising:
   a battery pack mounted below a floor pan of a vehicle cabin;
   a vehicle body framework member to which a vehicle horizontal direction end portion of the floor pan is joined; and
   a sealing member that has resilience and that plugs a gap between the battery pack and the vehicle body framework member, wherein:
   the vehicle body framework member includes a rocker extending in a vehicle front-rear direction;
   a floor plate of a battery case is joined to the rocker, the battery case being an outer casing of the battery pack; and
   the gap is partitioned from a vehicle exterior by the floor plate.

4. The battery mounting structure according to claim 2, wherein:
   the vehicle body framework member includes a rocker extending in a vehicle front-rear direction;
   the sealing member is retained at the battery pack; and
   the extrusion-molded component comprises a side wall portion of a battery case, the battery case being an outer casing of the battery pack.

5. The battery mounting structure according to claim 2, wherein:
   the vehicle body framework member includes a front cross-member and a rear cross-member extending in a vehicle width direction;
   the sealing member is retained at the battery pack; and
   the extrusion-molded component comprises a front wall portion and a rear wall portion of a battery case, the battery case being an outer casing of the battery pack.

6. The battery mounting structure according to claim 5, wherein the front wall portion is disposed below the front cross-member, and the rear wall portion is disposed below the rear cross-member.

7. The battery mounting structure according to claim 2, wherein:
   the vehicle body framework member includes a rocker extending in a vehicle front-rear direction; and
   the sealing member is retained at the rocker, the rocker comprising the extrusion-molded component.

8. A battery mounting structure, comprising:
   a battery pack mounted below a floor pan of a vehicle cabin;
   a vehicle body framework member to which a vehicle horizontal direction end portion of the floor pan is joined; and
   a sealing member that has resilience and that plugs a gap, wherein:
   the vehicle body framework member includes a rocker extending in a vehicle front-rear direction;
   a battery case is an outer casing of the battery pack, the battery case including a periphery wall and a floor plate, the floor plate being joined to the rocker;
   a fixing flange portion is provided at both end portions, in a vehicle width direction, of the floor plate, the fixing flange portion projecting further toward an outer side of the vehicle width direction than the periphery wall, the fixing flange portion being superposed with a lower face of the rocker and is joined to the rocker; and
   the gap plugged by the sealing member is formed between the periphery wall and the rocker, and the gap is partitioned from a vehicle exterior by the floor plate.

* * * * *